Patented Aug. 11, 1953

2,648,607

UNITED STATES PATENT OFFICE 2,648,607

PROTECTIVELY COATED EDIBLE CHEESE MORSELS AND METHOD OF PRODUCING SAME

Jacob Krusi, Thayne, Wyo.

No Drawing. Application February 19, 1951, Serial No. 211,803

6 Claims. (Cl. 99—117)

This invention relates to edible compositions of matter composed principally of cheese, and to methods of producing same. It is concerned primarily with cheese in the form of morsels, for example, crumbs, shreds, gratings, and other relatively small pieces of particle or somewhat larger size.

I have found that cheese morsels may be treated in such a way as to preserve them for long periods of time against mold growth and the development of rancidity, and to, at the same time, impart practically all of the nutritional values of whole milk. The resulting product is pleasant to the taste, easy and enjoyable to eat, and requires no special packaging for merchandising purposes.

My invention makes possible the profitable utilization of ordinarily unmerchantable cuts of cheese, as, for example, the "heels" of wheel style natural cheeses which remain after the body of the wheel has been cut into rectangular blocks for marketing.

An object of my invention, then, is to produce a true cheese product in morsel form, which has excellent keeping properties over long periods of time, embodies substantially all of the milk solids ordinarily lost during cheese manufacture, and has physical characteristics rendering it readily edible.

A further object is to provide a process whereby the product may be easily and economically produced in quantity, using as raw material, where desired, ordinarily unmarketable cuts of natural cheese.

The individual morsels making up the product have a characteristic brittleness not heretofore found in products consisting essentially of cheese. This is due primarily to a preservative coating of milk solids carried by each cheese morsel. The protectively coated morsels are not subject to mold growth, nor do they become rancid. They are pleasant to the taste, and exceedingly nutritious. The characteristic brittleness makes for enjoyable eating. The cheese particles are easily merchandised, since they require no special form of packaging and have a long shelf life. They may be eaten just as they come from the package, or may be used in cooking or added to cooked dishes. An especially advantageous characteristic of the product is that, when employed in connection with hot foods, no objectionable strings are formed.

My novel method involves the coating of morsels of cheese with dry whey powder, whereby moisture is absorbed from the cheese body into the exterior whey coating by reason of the hygroscopic nature of the whey powder. Thereafter, the so coated morsels are subjected to dehydration for the purpose of extracting moisture. During this phase of the process, it is believed that the particles of whey powder are bonded together to produce the desired brittle coating for the cheese body and to prevent excessive loss of moisture from the latter both during the stage of dehydration and later. The resulting product is effectively protected against mold growth and the development of rancidity, yet, contrary to ordinary dehydrated cheese, which is excessively hard, can be chewed easily and eaten with enjoyment.

Further objects and features of the invention will become apparent from the more detailed description which follows.

In the carrying out of my process, I reduce either natural or so-called "processed" cheese to the desired morsel form by suitable treatment of a cheese body preferably in prime condition, that is to say, prior to any detrimental atmospheric drying or undue standing around. It is to be understood, of course, that, in order to produce a high grade product, the cheese is selected for flavor and quality. In many instances, it will be preferred to use ordinarily wasted "heels" of wheel or other block cheeses in order to effect economies in the over-all operation of the cheese-producing plant. The cheese body may be grated, shredded, diced, or otherwise reduced in size to form the desired morsels. For example, where crumbs are desired, the cheese body is roughly grated.

As a second stage of the process, dried whey powder is applied to the surfaces of the cheese morsels. This may be accomplished in any suitable manner, for example, by rolling the morsels in a quantity of the powder, it being understood that, in any instance, the particle size of the whey powder is considerably less than the size of the cheese morsels. It is important that the entire surface area of each cheese morsel comes in contact with sufficient whey powder to provide a comprehensive coating of the powder.

Since the dry whey powder is hygroscopic in character, that which adheres to the individual cheese morsels will immediately extract a limited quantity of the natural moisture content of the cheese, becoming sticky in the process. Such stickiness makes for adherence of the small particles of whey powder to each other and to the cheese body, and promotes coalescence or bonding during the next stage of the process of the invention.

These relatively damp, whey-coated cheese morsels are then subjected to dehydration. This is conveniently accomplished by passing a stream of heated air over the coated cheese morsels, by placing the coated cheese morsels in an oven, or by otherwise subjecting the morsels to the drying action of heat. Other dehydrating procedures may also be employed; for example, ordinary vacuum drying has proven very effective.

Following this dehydration stage, the processed morsels are permitted to cool in the open air, and, thereafter, any crumbly lumps which are formed during the dehydration stage are broken up manually or by any suitable agitating apparatus.

The result is a loose mass of distinct or discrete morsels which are brittle in character.

During any of the above stages of the process, but preferably during the coating of the cheese morsels with the dry whey powder, various foreign flavoring substances, such as salt, spices, sauces, extracts, fried bacon, and the like, may be added; or various edible microbic cultures may be introduced—all to the end that the resulting product will be suited for particular culinary uses or prepared for particular tastes.

Liquid whey is derived in large quantities during the manufacture of cheese, and is customarily dried in any suitable and well-known manner for a variety of uses. It contains a large proportion of the solids of whole milk, and retains these solids in its dried condition. Accordingly, the dried whey powder supplies to the cheese morsels nutritious constituents of whole milk which are ordinarily lost during cheese manufacture.

The reduction of the normal moisture content of the cheese body by the extractive action of the whey powder and the subsequent elimination of moisture by dehydration are apparently responsible for the prevention of mold growth. But the resulting product is not hard, as is usually the case with cheese which has been subjected to dehydration. Rather, it has a characteristic brittleness. It is though that a relatively hard and tight superficial coating of milk solids is formed, which seals the butter fat of the inner cheese body against the rancidifying effect of the atmosphere and against mold growth.

Since different varieties of natural cheeses and different forms of so-called "processed" cheeses differ widely in their moisture and butter fat contents, it is not practical to here specify exact processing times and temperatures, except in particular instances cited as examples. In general, optimum processing times and temperatures must be determined in any individual instance by the criteria here set forth as respects the physical characteristics of the final product and by the respective melting points of the particular cheeses concerned, it being understood that in no instance is the cheese heated to its melting point, though temperatures which heat the cheese to an extent approaching this point may be satisfactorily utilized. The dehydration should be carried to the point of removing all but a relatively minor proportion of the normal moisture content, usually down to not greater than about 10% and in most instances to as low as from about 3 to 6%.

If at any time during the period of heating the coated particles there is observed a tendency for the massed morsels to become fused together into hard lumps, the processing temperature should be immediately lowered to a point where the condition no longer exists.

The relative size of whey particles to cheese particles should be kept in mind, it being understood that most satisfactory results are achieved when the particles of whey powder are considerably less in size than the cheese particles in order to obtain proper surface coverage of the latter by the former.

As a guide to the general application of my process, I cite specific instances as follows:

*Example No. 1*

A mass of crumbs of fresh, natural Swiss cheese derived by rough grating ordinarily wasted "heels," was rolled in a quantity of dried whey powder which passed a screen of approximately 60 mesh. The individual cheese morsels approximated 10 mesh in size.

There was sufficient excess whey powder and the cheese morsels were sufficiently agitated in the powder to insure thorough and complete surface coverage of the individual cheese morsels by adherence of the whey powder. The resulting raw, coated morsels contained cheese and whey powder in approximately the proportions of one to one, by weight.

The cheese had an initial moisture content and butter fat content normal to Swiss, i. e. Emmenthaler, cheese, namely, approximately 28% and 31%, respectively. The whey powder had initial moisture and butter fat contents normal for ordinary dried whey, namely, approximately 3% and 1.5%, respectively.

The coated cheese morsels were placed in an oven maintained between the temperatures of about 75 to about 80 degrees centigrade, and were left there for one hour, the final moisture content being approximately 6%.

The resulting product largely retained its loose character, and the few lumps crumbled readily after atmospheric cooling. It had a pleasant taste, and was brittle in character. It could be eaten readily and with enjoyment. The morsels crushed easily when chewed.

A portion of the product was placed in a cheese curing cellar maintained at a temperature of 75° F. and a relative humidity of approximately 80%, conditions which induce the development of mold upon natural Swiss cheese within a few days. In the case of these processed morsels, however, no mold growth was apparent after a period of three months. In fact, live mold placed with the processed morsels shriveled up after a few days.

Another portion of the product was placed in a plastic bag, which was left open and stored at normal room temperature for a period of approximately seven months. Whereas control samples of the same cheese morsels, unprocessed, were violently rancid at the end of this time, the processed morsels had developed not the slightest trace of rancidity. Furthermore, they had retained substantially their original crispness, flavor, and appearance.

*Example No. 2*

A mass of shreds of fresh, natural Cheddar cheese was rolled in a quantity of dry whey powder, as in Example No. 1. The cheese shreds were from ¼ to ¾ inch in length and about 3 millimeters in diameter. Relative proportions of cheese and whey powder in the individual morsels again approximated one to one by weight.

The initial moisture and butter fat contents of both cheese and whey powder were normal.

Oven temperatures during dehydration of the whey-coated morsels ranged between about 57 to 64 degrees centigrade, the higher temperature being reached gradually as the heating progressed. The dehydrating period, in this instance, extended over a period of about four hours, and the final moisture content in the individual morsels was found to be between 3 and 5%.

The so processed Cheddar cheese morsels were subjected to test similar to those cited in Example No. 1, under which untreated cheese would have turned moldy or rancid. The processed product was substantially unchanged, and retained practically all of its original qualities.

The above examples illustrate how my process may be advantageously applied in practice. Many other varieties of cheeses may be satisfactorily treated. Even the soft cheeses, such as Camembert, may be blended with harder cheeses to obtain a cheese body having the proper physical consistency for reduction to morsel form.

Accordingly, it can be seen that my invention contributes to the cheese industry a new product having highly advantageous and unique attributes, and a process enabling sound use of the hitherto difficult to dispose of by-product of the industry, namely, whey powder.

It should be realized that my novel cheese product is made up of true cheese morsels, which possess the unique characteristics of brittleness (making for enjoyable eating), high resistance to the development of mold and rancidity (making for long shelf life, and, consequently, easy merchantability), and greatly enhanced nutritiousness (due to the addition of normally lost milk solids).

The milk solids, applied in the form of a dry, adherent coating to the superficial surfaces of the individual cheese morsels, enable dehydration of the cheese to be accomplished without the usual bad effects. In this connection, I have found that dehydrating temperatures somewhat in excess of the melting temperatures of the cheese may be employed, so long as they are approached gradually and not continued for too long a time. The 64° centigrade noted in Example No. 2 is illustrative, since Cheddar cheese normally melts at 60° centigrade. Apparently the whey powder protects the cheese proper during the application of these temperatures.

Whereas this invention is here described with respect to particular embodiments thereof, it should be understood that various changes may be made on the basis of and consistent with the present disclosure, by those skilled in the art, without departing from the generic concepts herein set forth and defined by the broader of the following claims.

I claim:

1. An edible cheese product, comprising loose, discrete morsels of cheese, each morsel of which carries a superficial protective coating of milk solids normally present in whey, said morsels being characterized by brittleness and high resistance to the development of mold and rancidity.

2. An edible cheese product, comprising loose, discrete morsels of cheese individually enclosed by a superficial protective coating of milk solids, said morsels having a moisture content of from about 3% to 10%, and being characterized by brittleness and high resistance to the development of mold and rancidity.

3. A dehydrated cheese product, comprising discrete morsels of cheese individually bearing a superficial protective coating of adherent whey powder, the moisture content of both said cheese and said whey coating being reduced sufficiently to retard the development of mold and rancidity, and said morsels being brittle and readily edible.

4. A dehydrated cheese product, comprising discrete morsels of cheese individually bearing a superficial protective coating of adherent whey powder, the cheese and the whey powder being in the proportion of approximately one to one by weight.

5. A process of producing edible cheese morsels having high resistance to mold and rancidity and possessing a brittle consistency, comprising reducing a cheese body to morsels; superficially coating the individual morsels with dry powdered milk solids; and drying the so coated morsels.

6. A process of producing edible cheese morsels having high resistance to mold and rancidity and possessing a brittle consistency, comprising reducing a cheese body to morsels; superficially coating the individual morsels with dry whey powder; and heating the coated morsels at a temperature approximating the point at which the cheese is known to melt for a time sufficient to reduce the moisture content of said coated morsels in the range of from about 3% to 10%.

JACOB KRUSI.

References Cited in the file of this patent

UNITED STATES PATENTS

| Number | Name | Date |
|---|---|---|
| 1,737,770 | Parsons | Dec. 3, 1929 |